United States Patent [19]

Jung et al.

[11] Patent Number: 5,416,230
[45] Date of Patent: May 16, 1995

[54] 2-(ARYL)PROPYLHYDRIDOPOLYSILOXANE TYPE SILICONE FLUIDS AND METHODS FOR PREPARING THE SAME

[75] Inventors: Il N. Jung; Bok R. Yoo; Bong W. Lee, all of Seoul, Rep. of Korea

[73] Assignee: Korea Institute of Science and Technology, Seoul, Rep. of Korea

[21] Appl. No.: 302,263

[22] Filed: Sep. 8, 1994

[30] Foreign Application Priority Data

Dec. 1, 1993 [KR] Rep. of Korea ............... 1993-26070

[51] Int. Cl.⁶ .................................................. C07F 7/08
[52] U.S. Cl. .................................................. 556/451
[58] Field of Search .......................................... 556/451

[56] References Cited

U.S. PATENT DOCUMENTS

| | | |
|---|---|---|
| 4,873,011 | 10/1989 | Jung et al. |
| 4,965,385 | 10/1990 | Jung et al. |
| 5,075,477 | 12/1991 | Jung et al. |
| 5,221,759 | 6/1993 | Haeberle et al. ........... 556/451 X |
| 5,233,069 | 8/1993 | Jung et al. |
| 5,235,061 | 8/1993 | Jung et al. |
| 5,235,083 | 8/1993 | Jung et al. |
| 5,272,243 | 12/1993 | Nakashima et al. ......... 556/451 X |
| 5,302,734 | 4/1994 | Jung et al. |
| 5,304,667 | 4/1994 | Haeberle et al. ........... 556/451 X |
| 5,332,849 | 7/1994 | Jung et al. |
| 5,338,876 | 8/1994 | Jung et al. |

*Primary Examiner*—Paul F. Shaver
*Attorney, Agent, or Firm*—Oblon, Spivak, McClelland, Maier, & Neustadt

[57] ABSTRACT

The present invention relates to novel 2-(aryl)hydrogenpolysiloxane type silicone fluids as represented by the formula I and their preparation methods by hydrolyzing mixtures of 2-(aryl)hydrogendichlorosilane and diorganodichlorosilane as represented by the formula II and formula III respectively.

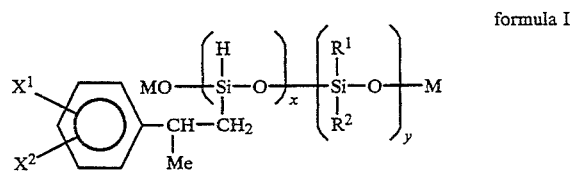

formula I

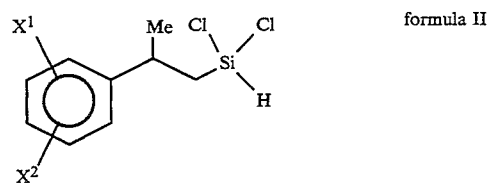

formula II

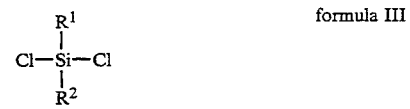

formula III wherein $X^1$ and $X^2$ represent independent hydrogen or alkyl ($C_1$–$C_3$), phenyl, phenoxy, fluoro, chloro, bromo, mercapto, mercaptomethyl group; $R^1$ and $R^2$ represent independently methyl or phenyl group; M represents H or $SiMe_3$ group wherein Me represents methyl and when M is hydrogen, the silanol groups at the both ends of the molecule easily undergo dehydration so that they can cyclize to form the cyclic silicone fluids. The mixing ratio (x/y) of the compounds as represented in formula II and formula III respectively can be 1:0.01–1:100.

4 Claims, No Drawings

2-(ARYL)PROPYLHYDRIDOPOLYSILOXANE TYPE SILICONE FLUIDS AND METHODS FOR PREPARING THE SAME

BACKGROUND OF THE INVENTION

1. Field of the Invention

The present invention relates to novel cyclic or linear 2-(aryl)hydrogenpolysiloxane type silicon fluids as represented by the formula I and their preparation methods by hydrolyzing mixtures of 2-(aryl)hydrogendichlorosilane and diorganodichlorosilane as represented by the formula II and formula III respectively.

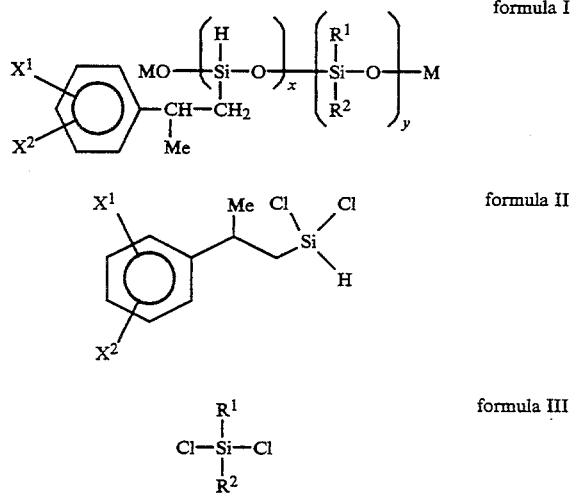

formula I formula II formula III wherein $X^1$ and $X^2$ represent independently hydrogen or alkyl ($C_1$-$C_3$), phenyl, phenoxy, fluoro, chloro, bromo, mercapto, or mercaptomethyl group; $R^1$ and $R^2$ represent independently methyl or phenyl group; M represents H or $SiMe_3$ group wherein Me represents methyl and when M is hydrogen, the silanol groups at the both ends of the molecule easily undergo dehydration so that they can cyclize to form the cyclic silicone fluids. The mixing ratio (x/y) of the compounds as represented in formula II and formula III respectively can be 1:0.01–1:100.

2. Description of the Prior Art

It is well known in the art that polymethylhydrogensiloxanes when applied to textile fabrics or masonry, are capable of imparting water repellency thereto. (Walter Noll, Chemistry and Technology of Silicone, Academic Press, 1968, p-196) When they are condensed on the fiber, polymethylhydrogensiloxanes give a hard non-sticky film. Regarded chemically, this is a case of cross-linking through the formation of Si—O—Si bonds in place of the Si—H bond. The cross-linking reaction can be initiated by water, more quickly in an alkaline medium; the former gives rise to hydrolysis of the Si—H bonds to silanol groups, which is subsequently condensed to give siloxanes. The cross-linking reaction of Si—H bond can be brought about not only by hydrolytic rupture but also by oxidation at elevated temperatures, possibly under the action of a catalyst.

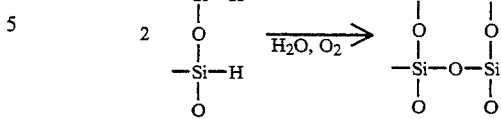

In general, the preparation of organosilicone fluids is performed by the hydrolysis and condensation of organosilanes, such as those having two methyl or other organic radicals bonded to the silicon atoms, has heretofore been described. The hydrolysis is conducted by reacting a chlorosilane, such as dimethyldichlorosilane, with water, generally in the presence of an inert solvent. The organosilicone fluids are thus obtained without difficulty. (Wilcock, U.S. Pat. No. 2,491,843, Patnode and Wilcock, J. Am. Chem. Soc., 68, 358 (1946)) Dimethyldichlorosilane gives with water a mixture of polydimethylcyclosiloxanes and linear polydimethylsiloxane-α,ω-diols. Depending upon the hydrolysis methods, the ratio of cyclic and linear fluids in the products varies. Hydrolysis with dilute hydrochloric acid or the employment of organic solvent in hydrolysis can increase the proportion of cyclic fluids. The so-called "reversed" hydrolysis, in which a calculated amount of water is added to the mixture of organochlorosilanes, is recommended for the co-hydrolysis of organochlorosilanes having widely differing rates. Thus, the "reversed" hydrolysis has been recommended for the co-hydrolysis of silane mixtures of dichlorodimethylsilane and methyltrichlorosilane, methyltrichlorosilane and chlorotrimethylsilane, or of diorganidichlorosilanes with different organic substituents. (Walter Noll, Chemistry and Technology of Silicone, Academic Press, 1968, p-196) The special modified silicone fluids can be prepared by replacing a proportion of the methyl groups in polydimethylsiloxanes by other organic groups such as phenyl, vinyl, hydrido, etc. When the fluids of type polymethylhydrogen-siloxanes is applied to textile fabrics or masonry, the substrates become water repellent. Since they are hydrosilated with polymethylvinylsiloxanes a rubbery material is obtained, they are used for the manufacture of two-components room temperature vulcanizing rubber.

The chlorosilanes may be dissolved in an inert organic solvent such as toluene, benzene, carbon tetrachloride, ether, liquid aliphatic hydrocarbons. By hydrolysis of methyldichlorosilane equivalent fluids should be producible, in as much as the silicon-bonded hydrogen is not readily hydrolyzed by water. Instead, when methyldichlorosilane is hydrolyzed with water, hard, brittle products are produced instead of the expected fluids. Obviously, under these conditions the hydrogen has been cleaved from the silicon. Various methods have been proposed for avoiding this result. Thus, the use of an inert solvent has been suggested. Likewise, it has been proposed that the cleavage of the hydrogen may be avoided by maintaining low temperature during hydrolysis. A third method which has been proposed to avoid the production of the resinous products is the co-hydrolysis of trimethylchlorosilane with the methyldichlorosilane. The first two proposals above mentioned are not entirely sufficient. The third method effects solubilizing of the product only by virtue of end-blocking, and not by reduction in hydrogen loss from the siloxane. Accordingly, these methods have not led to entirely satisfactory results. At best, only a small amount of oil is obtained, the remainder being useless.

Nitzsche and Pirson later reported on improved methods for the hydrolysis of methyldichlorosilane to obtain improved hydrolysis products in improved yield in U.S. Pat. No. 2,647,911. In accordance with the process of the invention, methyldichlorosilane is reacted with an alcohol to effect interchange of alkoxy radicals for chlorine atoms, the alcohol being employed in amount less than two moles of alcohol per mole of methyldichlorosilane. The reaction product, which then contains both chlorine atoms and alkoxyl radicals bonded to the silicon, is hydrolyzed by reacting it with water in amount sufficient to hydrolyze both the chlorine atoms and the alkoxy radicals in the presence of an inert solvent. Operation in this manner results in the preferential formation of oils.

John C. Goossens reported in U.S. Pat. No. 3,462,386 the preparation of the copolymers containing diorganosiloxy units and organohydogensiloxy units. The organic groups were selected from monovalent hydrocarbon radicals or halogenated monovalent hydrocarbon radicals. Fukuda and his coworkers reported in U.S. Pat. No. 4,528,156 that dimethylpolysiloxanes containing Si—H bonds could be added to vinyl containing silicones in the presence of platinum catalyst to give room temperature vulcanizing silicone rubber.

The present inventors reported that allyldichlorosilane as the major product and allyltrichlorosilane were prepared by reacting allyl chloride, incorporated with hydrogen chloride, with elemental silicon in the presence of copper catalyst at a temperature from 260° C. to 360° C. Cadmium was a good promoter and the reaction could be carried out in a fluidized bed or a stirred bed reactor. The incorporation of hydrogen chloride suppressed the decomposition of allyl chloride and prevented the production of diallyldichlosilane. Diallyldichlosilane easily caused the polymerization of the products at the reaction temperature. (Korean Patent Appln. No. 92-10292 (filed Jun. 13, 1992))

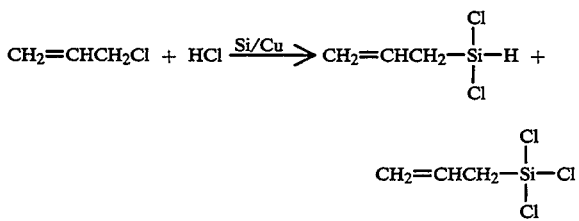

We also reported the preparation of 2-(aryl)propyldichlorosilane by the Friedel-Craft reaction of allyldichlorosilane with aromatic compounds using aluminum chloride as a catalyst. Aromatic compounds could be benzene, alkyl substituted benzenes, halogen substituted benzenes, thiol or mercaptoalkyl substituted benzenes, naphthalene, byphenyl, byphenyl ethers, etc. (Korean Patent Appln. No. 92-12996 (7.21. 1992))

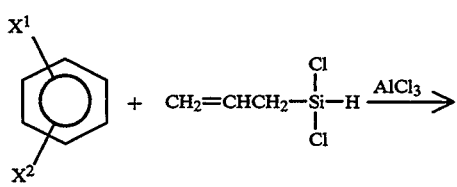

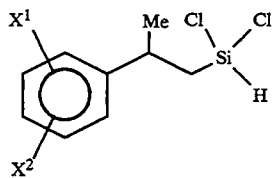

SUMMARY OF THE INVENTION

The present invention relates to novel 2-(aryl)hydrogenpolysiloxane type silicone fluids as represented by the formula I and their preparation methods by hydrolyzing mixtures of 2-(aryl)hydrogendichlorosilane and diorganodichlorosilane as represented by the formula II and formula III respectively.

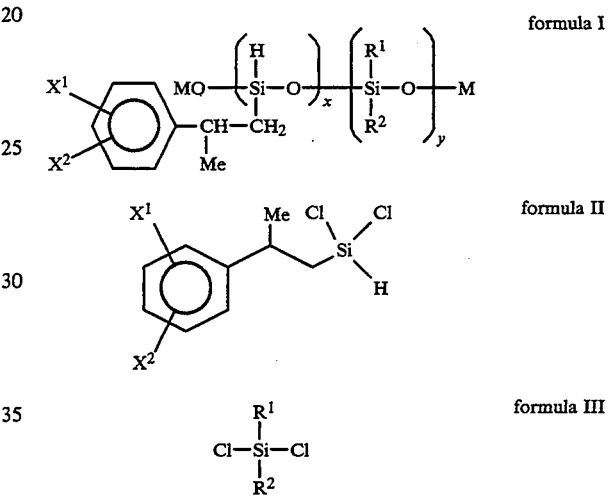

wherein $X^1$ and $X^2$ represent independently hydrogen or alkyl($C_1$-$C_3$), phenyl, phenoxy, fluoro, chloro, bromo, mercapto, or mercaptomethyl group; $R^1$ and $R^2$ represent independently methyl or phenyl group; M represents H or $SiMe_3$ group wherein Me represents methyl and when M is hydrogen, the silanol groups at the both ends of the molecule easily undergo dehydration so that they can cyclize to form the cyclic silicone fluids. The mixing ratio (x/y) of the compounds as represented in formula II and formula III respectively can be 1:0.01–1:100.

DETAILED DESCRIPTION OF THE INVENTION 2-(Aryl)hydrogenpolysiloxanes type silicone fluids as represented by formula I according to the present invention can be prepared by any suitable methods described as below. For example, 2-(aryl)propylhydrogenpolysiloxanes endblocked with hydroxy group or trimethylsiloxy groups are prepared by hydrolyzing 2-(aryl)propyldichlorosilane or a mixture of trimethylchlorosilane and 2-(aryl)propyldichlorosilane. The chlorosilanes may be dissolved in an inert organic solvent such as toluene, benzene, carbon tetrachloride, ether, liquid aliphatic hydrocarbons, etc. and then hydrolyzed by pouring the solution into water or the other way around. After hydrolysis the solution has been thoroughly washed with water to remove all, or substantially all, of the hydrochloric acid and then the solvent may be distilled to give the fluids. 2-(Aryl)-propylhydrogenpolysiloxanes end-blocked with hydroxy group are prepared by hydrolyzing 2-(aryl)-propyldichlorosilane only. The same fluids end-blocked with trimethylsiloxy groups may be prepared by co-hydrolyzing 2-(aryl)propyldichlorosilane and trimethylchlorosilane or equilibrating 2-(aryl)propylhydrogenpolysiloxanes end-blocked with hydroxy group and hexamethyldisiloxane using concentrated sulfuric acid or $CF_3SO_3H$. The copolymers containing diorganosiloxy- and 2-(aryl)propylhydridosiloxy-groups may be prepared by co-hydrolyzing diorganodichlorosilane and 2-(aryl)propyl-dichlorosilane and then eqiulibrating the products with hexamethyldisiloxane. The same fluids may be prepared by eqiulibrating 2-(aryl)propylhydrogenpolysiloxanes end-blocked with trimethylsiloxy group and cyclic diorganopolysiloxanes using concentrated sulfuric acid or $CF_3SO_3H$ The invention will be further illustrated by the following examples. It is, however, not intended that this invention will be limited by the examples.

EXAMPLE 1

To a 300 ml, three neck, round bottomed flask equipped with a mechanical stirrer, a dropping funnel, and a condenser were added 5 g (0.02 mol) of 3-phenyl-1,1-dichloro-1-silabutane and 30 ml of ether. Through the dropping funnel was added dropwise 20 ml of water over 30 min. After the solution was reacted for another hour with stirring, the organic layer was separated and washed three times with 20 ml of distilled water. The solution was dried over $Mg_2SO_4$ and distilled under reduced pressure to remove the solvent. This product was very viscous liquid. The amount of the obtained product was 3.6 g. The GPC analysis result of this product represented by mean molecular weight of 5,000. As the analysis results by nuclear magnetic resonance spectroscopy (300 MHz) were observed peaks corresponding to $Si-CH_2$ at 0.89–1.20 ppm, $C-CH_3$ at 1.25–1.43 ppm, CH at 2.92–3.10 ppm, Si—H at 4.54–4.69 ppm, aryl-H at 7.11–7.35 ppm.

EXAMPLE 2

The same procedure as Example 1 was repeated except that 3-(4-methylphenyl)-1,1-dichloro-1-silabutane was used instead of 3-phenyl-1,1-dichloro-1-silabutane. The amount of the obtained product was 3.6, with means molecular weight of 5,000.

The products prepared by hydrolyzing various organochlorosilanes according to the procedures described above are listed in Table 1.

TABLE 1

$$X_1, X_2\text{-phenyl}-CH(CH_3)-CH_2-[Si(H)-O]_n$$

| $X_1$ | $X_2$ | $SiCH_2$ | $CH_3$ | CH | SiH | Aryl—H | $X_1$ and $X_2$ |
|---|---|---|---|---|---|---|---|
| H | H | 0.89–1.20 | 1.25–1.43 | 2.92–3.10 | 4.54–4.69 | 7.11–7.35 | |
| H | m & p-$CH_3$ | 0.99–1.24 | 1.25–1.44 | 2.98–3.16 | 4.62–4.77 | 7.00–7.35 | 2.35(bf.s, 3H, $CH_3$) |
| H | m & p-Et | 1.00–1.23 | 1.25–1.43 | 3.00–3.17 | 4.63–4.78 | 6.96–7.38 | 1.25–1.43(br.m, 3H, $CH_3$), 2.66–2.78(br.s, 2H, $CH_3$) |
| H | m & p-iso-pr | 1.03–1.27 | 1.28–1.51 | 3.02–31.7 | 4.63–4.78 | 6.96–7.38 | 1.28–1.51(br.m, 3H, $CH_3$), 2.91–2.03(br.s, 1H, CH) |
| H | o-F | 0.86–1.09 | 1.21–1.34 | 3.30–3.40 | 4.53–4.72 | 6.94–7.30 | |
| H | p-F | 0.86–1.09 | 1.21–1.34 | 2.83–3.05 | 4.53–4.72 | 6.94–7.30 | |
| H | o-Cl | 0.86–1.10 | 1.23–1.39 | 3.34–342 | 4.53–4.72 | 7.07–7.39 | |
| H | p-Cl | 0.86–1.10 | 1.23–1.39 | 2.87–3.00 | 4.53–4.72 | 7.07–7.39 | |
| H | o-Br | 0.86–1.05 | 1.20–1.31 | 3.45–3.56 | 4.53–4.72 | 7.00–7.54 | |
| H | p-Br | 0.86–1.05 | 1.20–1.31 | 2.85–2.98 | 4.53–4.72 | 7.00–7.54 | |
| H | m & p-Ph | 1.03–1.23 | 1.27–1.47 | 3.01–3.15 | 4.53–4.72 | 7.25–7.65 | 7.25–7.65(m, 5H, Phenyl-H) |
| H | m & p-OPh | 1.01–1.24 | 1.26–1.44 | 3.10–3.42 | 4.54–4.80 | 6.90–7.43 | 6.90–7.43(m, 5H, Phenyl-H) |
| H | m & p-SH | 0.90–1.26 | 1.27–1.45 | 2.92–3.10 | 4.52–4.79 | 7.02–7.47 | 2.80–3.00(br.s, 1H, SH) |
| H | m & p-$CH_2SH$ | 0.93–1.23 | 1.27–1.43 | 2.89–3.03 | 4.53–4.78 | 718–7.43 | 3.25–3.37(br.s, 2H, $CH_2$), 2.85–3.05(br.s, 1H, SH) |
| 2 & 3-$CH_3$ | 3 & 4-$CH_3$ | 0.89–1.08 | 1.20–1.33 | 2.85–3.04 | 4.58–4.71 | 6.87–7.08 | 2.24(br.s, 6H, $CH_3$) |
| 2 & 3-$CH_3$ | 4 & 5-$CH_3$ | 0.88–1.09 | 1.20–1.33 | 2.85–3.04 | 4.58–4.70 | 6.87–7.08 | 2.25(br.s, 6H, $CH_3$) |
| 2-$CH_3$ | 5-$CH_3$ | 0.91–1.13 | 1.20–1.39 | 3.25–3.38 | 4.58–4.71 | 6.95–7.15 | 2.37 & 2.39(br.s, 3H, $CH_3$) |

EXAMPLE 3

The same procedure as Example 1 was repeated except that a mixture of 3-(3,4-dimethylphenyl)-1,1-dichloro-1-silabutane (2.5 g, 0.01 mol) and dimethyldichlorosilane (1.3 g, 0.01 mol) was used instead of 3-phenyl-1,1-dichloro-1-silabutane. The amount of the obtained product was 3.6 with mean molecular weight of 20,000.

NMR data of this type co-polymeric products were similar to those of the corresponding homopolymer listed in Table 1 except the peaks due to the dimethylsiloxy group at 0.05–0.22 ppm.

EXAMPLE 4

The same procedure as Example 1 was repeated except that a mixture of 3-(2 & 4-fluorophenyl)-1,1-dichloro-1-silabutane (4.7 g, 0.02 tool)and dimethyldichlorosilane (0.03 g, 0.0002 mol) was used instead of 3-phenyl-1,1 -dichloro-1-silabutane. The amount of the obtained product was 3.3 g with mean molecular weight of 5,000.

NMR data of this type co-polymeric products were similar to those of the corresponding co-polymer of Example 3.

EXAMPLE 5

The same procedure as Example 1 was repeated except that a mixture of 3-(3 & 4-mercaptophenyl)- 1,1-dichloro-1-silabutane (0.13 g, 0.0005 mol) and dimethyldichlorosilane (6.5 g, 0.05 mol) was used instead of 3-phenyl-1,1-dichloro-1-silabutane. The amount of the obtained product was 3.0 g, with mean molecular weight of 30,000.

NMR data of this type co-polymeric products were similar to those of the corresponding co-polymer of Example 3.

EXAMPLE 6

The same procedure as Example 1 was repeated except that a mixture of 3-(4-bromophenyl)-1,1-dichloro-1-silabutane (3.5 g, 0.012 mol) and dimethyldichlorosilane (1.52 g, 0.011 mol) was used instead of 3-phenyl-1,1-dichloro-1-silabutane. The amount of the obtained product was 2.84 g with mean molecular weight of 20,000.

NMR data of this type co-polymeric products were similar to those of the corresponding homopolymer listed in Table 1 except the peaks due to the methyl of methylphenylsiloxy group at 0.09–0.40 ppm. The peaks due to the phenyl of methylphenylsiloxy group were overlapped with the other phenyl peaks.

EXAMPLE 7

The same procedure at Example 1 was repeated except that a mixture of 3-(2 & 4-chlorophenyl)-1,1-dichloro-1-silabutane (2.7 g, 0.0011 mol), dimethyldichlorosilane (1.3 g, 0.011 mol), and trimethylchlorosilane (0.2 g, 0.002 mol) was used instead of 3-phenyl-1,1-dichloro-1-silabutane. The obtained product was trimethylsiloxy end-blocked fluid and the amount of the product was 2.3 g with mean molecular weight of 8,000.

NMR data of this type co-polymeric products were similar to those of the corresponding homopolymer listed in Table 1 except the peaks due to the trimethylsiloxy group at 0.01–0.23 ppm.

What is claimed is:

1. Cyclic or linear 2-(aryl)hydrogenplysiloxane type silicone fluids as represented by the formula I.

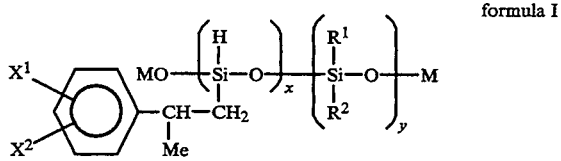

formula I wherein $X^1$ and $X^2$ represent independently hydrogen or alkyl ($C_1$–$C_3$), phenyl, phenoxy, fluoro, chloro, bromo, mercapto, or mercaptomethyl group; $R^1$ and $R^2$ represent independently methyl or phenyl group; M represents H or $SiMe_3$ group wherein Me represents methyl and when M is hydrogen, the silanol groups at the both ends of the molecule easily undergo dehydration so that they can cyclize to form the cyclic silicone fluids, and the mixing ratio (x/y) can be 1:0.01–1:100.

2. The method to prepare the Si—OH end-blocked linear 2-(aryl)hydrogenpolysiloxane type silicone fluids as represented by the formula I of claim 1, wherein M is H, by hydrolyzing 2-arylpropylhydrodichlorosilane as represented by the formula II in organic solvent or without using any solvent.

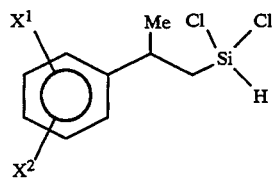

formula II wherein $X^1$ and $X^2$ represent independently hydrogen or alkyl($C_1$–$C_3$), phenyl, phenoxy, fluoro, chloro, bromo, mercapto, mercaptomethyl group.

3. The method to prepare the trimethylsiloxy group end-blocked linear co-polymer type silicon fluids of 2-(aryl)hydrogenpolysiloxane and diorganopolysiloxane as represented in formula I, wherein M is trimethylsiloxy group, by hydrolyzing a mixture of 2-arylpropylhydrodichlorosilane as represented by the formula II, diorganodichlorosilane as represented as by the formula III, and trimethylchlorosilane in organic solvent or without using any solvent.

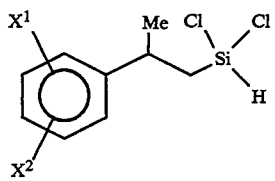

formula II

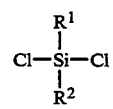

formula III wherein $X^1$ and $X^2$ represent independently hydrogen or alkyl($C_1$–$C_3$), phenyl, phenoxy, fluoro, chloro, bromo, mercapto, mercaptomethyl group and $R^1$ and $R^2$ represent independently methyl or phenyl group.

4. The method to prepare the Si—OH end-blocked co-polymer type silicone fluids of 2-(aryl)hydrogenpolysiloxane and diorganopolysiloxane as represented by the formula I, wherein M is H, by hydrolyzing the mixture of 2-arylpropylhydrodichlorosilane as represented by the formula II and diorganodichlorosilane as represented as by the formula III in organic solvent or without using any solvent.

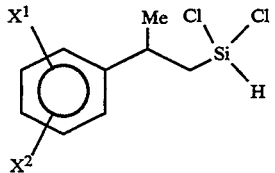

formula II

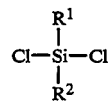

formula III wherein $X^1$ and $X^2$ represent independently hydrogen or alkyl($C_1$–$C_3$), phenyl, phenoxy, fluoro, chloro, bromo, mercapto, mercaptomethyl group and $R^1$ and $R^2$ represent independently methyl or phenyl group.

* * * * *